(12) United States Patent
Brown et al.

(10) Patent No.: US 9,031,299 B2
(45) Date of Patent: May 12, 2015

(54) LOW DOSE CT DENOISING

(75) Inventors: Kevin M. Brown, Mentor on the Lake, OH (US); Stanislav Zabic, Highland Heights, OH (US)

(73) Assignee: Koninklijke Philips N.V., Eindhoven (NL)

( * ) Notice: Subject to any disclaimer, the term of this patent is extended or adjusted under 35 U.S.C. 154(b) by 102 days.

(21) Appl. No.: 13/879,821

(22) PCT Filed: Oct. 17, 2011

(86) PCT No.: PCT/IB2011/054588
§ 371 (c)(1),
(2), (4) Date: Apr. 17, 2013

(87) PCT Pub. No.: WO2012/056364
PCT Pub. Date: May 3, 2012

(65) Prior Publication Data
US 2013/0208971 A1    Aug. 15, 2013

Related U.S. Application Data

(60) Provisional application No. 61/407,040, filed on Oct. 27, 2010.

(51) Int. Cl.
*G06T 5/00* (2006.01)
*G06T 11/00* (2006.01)

(52) U.S. Cl.
CPC ............... *G06T 5/001* (2013.01); *G06T 5/002* (2013.01); *G06T 11/005* (2013.01); *G06T 2207/10081* (2013.01); *G06T 2207/20004* (2013.01)

(58) Field of Classification Search
None
See application file for complete search history.

(56) References Cited

U.S. PATENT DOCUMENTS

| | | | |
|---|---|---|---|
| 4,991,093 A * | 2/1991 | Roberge et al. | 382/131 |
| 6,016,333 A * | 1/2000 | Kalvin | 378/4 |
| 6,490,476 B1 * | 12/2002 | Townsend et al. | 600/427 |
| 6,507,633 B1 * | 1/2003 | Elbakri et al. | 378/8 |
| 2003/0076988 A1 * | 4/2003 | Liang et al. | 382/131 |
| 2003/0219152 A1 * | 11/2003 | August | 382/131 |
| 2004/0094720 A1 * | 5/2004 | Dagan et al. | 250/370.12 |
| 2005/0135698 A1 * | 6/2005 | Yatsenko et al. | 382/260 |
| 2005/0220265 A1 * | 10/2005 | Besson | 378/16 |
| 2006/0078181 A1 * | 4/2006 | Chen et al. | 382/128 |
| 2006/0285002 A1 * | 12/2006 | Robinson et al. | 348/335 |
| 2007/0195925 A1 * | 8/2007 | Shechter et al. | 378/17 |

(Continued)

FOREIGN PATENT DOCUMENTS

WO    2010011676 A2    1/2010

OTHER PUBLICATIONS

Jia et al., GPU-based Fast Low-Dose Cone Beam CT Reconstruction via Total Variation, Radiation Oncology, Nov. 11, 2010, starting on pp. S45 vol. 78, Issue 3, supplement, (http://arxiv.org/ftp/arxiv-papers/1001/1001.0599.pdf.

(Continued)

*Primary Examiner* — Tsung-Yin Tsai

(57) ABSTRACT

A system includes a source that rotates about an examination region and emits radiation that traverses the examination region, a radiation sensitive detector array that detects radiation traversing the examination region and generates projection data indicative of the detected radiation, and a projection data de-noiser that de-noises the projection data, wherein the de-noiser de-noises a projection based on a number of detected photons for the projection.

19 Claims, 2 Drawing Sheets

(56) References Cited

U.S. PATENT DOCUMENTS

| | | | |
|---|---|---|---|
| 2009/0072156 A1* | 3/2009 | Chinn et al. | 250/363.04 |
| 2009/0141995 A1 | 6/2009 | Chakraborty et al. | |
| 2010/0303196 A1* | 12/2010 | Zou | 378/5 |
| 2011/0168909 A1* | 7/2011 | Nakao et al. | 250/370.09 |
| 2011/0286651 A1* | 11/2011 | Yu et al. | 382/131 |
| 2012/0183194 A1 | 7/2012 | Brown et al. | |
| 2012/0224760 A1 | 9/2012 | Goshen et al. | |

OTHER PUBLICATIONS

Hsieh, J.; Adaptive streak artifact reduction in computed tomography resulting from excessive x-ray photon noise; 1998; Med. Phys.; 25(11)2139-2147.

Harmany, et al., Sparsity-Regularized Photon-Limited Imaging, Biomedical Imaging: From Nano to Macro, 2010 IEEE International Symposium, Jun. 21, 2010, 4 sheets.

Shi, A simplified implementation of total variation iterative reconstruction algorithm suitable for parallel computation, Nuclear Science Symposium Conference Record (MSS/MIC), 2009 IEEE, originally published Oct. 24, 2009-Nov. 1, 2009, current version Jan. 29, 2010, pp. 4130-4133.

Wang, J., et al.; Penalized Weighted Least-Squares Approach to Sinogram Noise Reduction and Image Reconstruction for Low-Dose X-Ray Computed Tomography; 2006; IEEE Trans. on Medical Imaging; 25(10) 1272-1283.

Chan, T. F., et al.; Image Processing and Analysis: Variational, PDE, Wavelet, and Stochastic Methods; 2005; SIAM Philadelphia; abstract.

Song et al., Sparseness prior based iterative image reconstruction for retrospectively gated cardiac micro-CT, Med Phys., Nov. 2007, pp. 4476-4483, vol. 34, No. 11.

Le et al., A Variational Approach to Reconstructing Images Corrupted by Poisson Noise, J Math Imaging Vis, Mar. 30, 2007, 7 sheets, Springer Science + Business Media, LLC.

Thibault, et al., A Recursive Filter for Noise Reduction in Statistical Iterative Tomographic Imaging, Proc. of SPIE-IS&T Electronic Imaging, 2006, pp. 60650X-1-60650X-10, vol. 6065.

\* cited by examiner

LOW DOSE CT DENOISING

CROSS REFERENCE TO RELATED APPLICATIONS

This application is a national filing of PCT application Serial No. PCT/IB2011; 054588, filed Oct. 11, 2011, published as WO 2012/056364 A1 on May 3, 2012, which claims the benefit of U.S. provisional application Ser. No. 61/407, 040 filed Oct. 27, 2010, which is incorporated herein by reference.

The following generally relates to de-noising data and finds particular application to computed tomography (CT) and is also amenable to other imaging modalities such as a hybrid PET/CT system, a digital x-ray system, and/or other imaging modality.

A multi-slice computed tomography (CT) scanner includes an x-ray tube mounted on a rotatable gantry that rotates around an examination region about a longitudinal or z-axis. The x-ray tube emits radiation that traverses the examination region and a subject or object therein. A two-dimensional detector array subtends an angular arc opposite the examination region from the x-ray tube. The detector array includes a plurality of rows of detectors that are aligned with respect to each other and that extend along the z-axis. The detectors detect radiation that traverses the examination region and the subject or object therein and generate projection data indicative thereof. A reconstructor processes the projection data and reconstructs three-dimensional (3D) volumetric image data indicative thereof. The volumetric image data is processed to generate one or more images of the examination region, including the portion of the subject or object disposed therein.

Unfortunately, CT scanners emit ionizing radiation and thus expose the patient to ionizing radiation, which may increase risk of cancer. Generally, the radiation dose deposited in the patient depends on multiple factors, including, but not limited to, tube current (mAs), tube voltage (kVp), pitch/exposure time (for helical scans), slice thickness and spacing (for axial scans), the number of scans in a study, and patient build (e.g., thicker or thinner). The deposited dose can be reduced by decreasing tube current, tube voltage and/or the number of scans, and/or increasing the pitch, slice thickness and/or slice spacing. However, image noise is inversely proportional to radiation dose, and thus reducing radiation dose not only reduces the dose deposited in the patient but also increases image noise in the acquired data, which is propagated to the images during reconstruction, reducing image quality (i.e., noisier images), which may degrade the diagnostic value of the procedure.

Image-based de-noising algorithms have been applied. However, they have difficulty in dealing with "streaky" images, where the noise is strongly correlated between neighboring voxels of the image data. Generally, very low levels of photon flux in projection measurements generates streaks in the reconstructed images. Also, when the mean number of detected photons is very low (e.g., <10), the logarithm operation introduces a bias, which can show up in images as a shifted mean CT number. Iterative reconstructions such as the Maximum Likelihood (ML) based reconstructions have the potential to yield improved images in these cases. However, such ML based reconstructions are extremely computationally expensive, which currently hinders their use in routine practice.

Aspects of the present application address the above-referenced matters and others.

According to one aspect, a system includes a source that rotates about an examination region and emits radiation that traverses the examination region, a radiation sensitive detector array that detects radiation traversing the examination region and generates projection data indicative of the detected radiation, and a projection data de-noiser that de-noises the projection data, wherein the de-noiser de-noises a projection based on a number of detected photons for the projection.

According to another aspect, a method includes obtaining projection data generated by an imaging system, determining an estimated number of detected photons for a two dimensional projection of the projection data and generating a signal indicative thereof; and de-noising the projection based on the signal. A degree of the de-nosing is proportional to the estimated number of detected photons for the projection, and at least two projections are de-noised to two different degrees.

According to another aspect, a method includes de-nosing an image having noise that is strongly correlated between neighboring voxels of the image, wherein the de-noising does not introduce streak artifact into the de-noised image.

The invention may take form in various components and arrangements of components, and in various steps and arrangements of steps. The drawings are only for purposes of illustrating the preferred embodiments and are not to be construed as limiting the invention.

Figure 1:
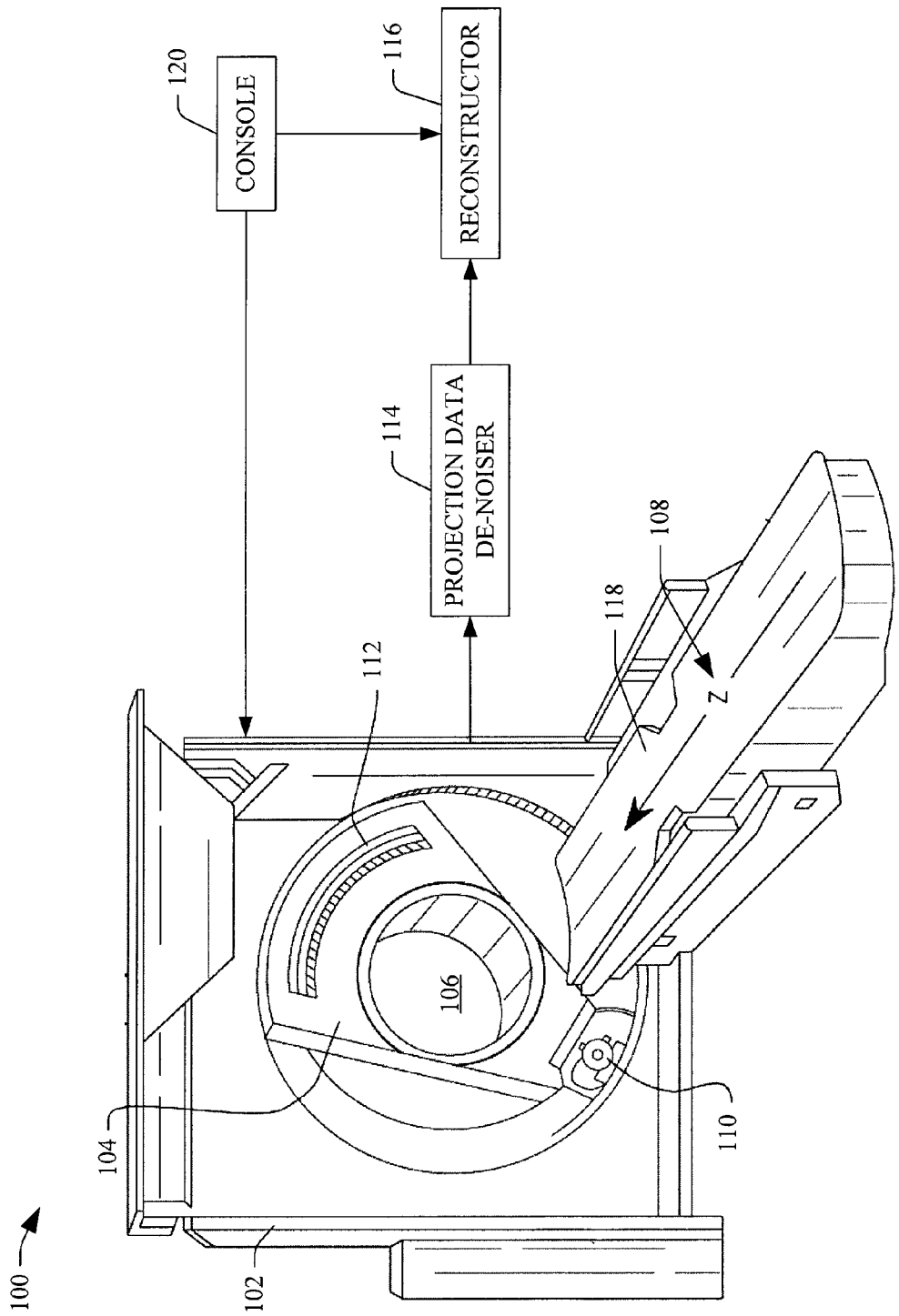
FIG. 1 illustrates an example imaging system in connection with a projection data de-noiser.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis 108.

A radiation source 110, such as an x-ray tube, is rotatably supported by the rotating gantry 104. The radiation source 110 rotates with the rotating gantry 104 and emits radiation that traverses the examination region 106. A source collimator includes collimation members that collimate the radiation to form a generally cone, wedge, fan or other shaped radiation beam.

A two-dimensional radiation sensitive detector array 112 subtends an angular arc opposite the radiation source 110 across the examination region 106. The detector array 112 includes a plurality of rows of detectors that extend along the z-axis 108 direction. The detector array 112 detects radiation traversing the examination region 106 and generates projection data indicative thereof.

A projection data de-noiser 114 de-noises projection data. As descried in greater detail below, in one instance, the de-noiser 114 employs an algorithm in which projections corresponding to a lower number of photons are de-noised more aggressively than projections corresponding to a higher number of photons. Such an algorithm allows for reducing streaks and/or bias in the reconstructed images due to a lower number of photons (e.g., due to patient size, a low dose scan, etc.) while preserving strong gradients (i.e., edges) in the data and thus image resolution.

A reconstructor 116 reconstructs the de-noised projection data and generates three-dimensional (3D) volumetric image data indicative thereof. The reconstructor 116 may employ a conventional 3D filtered-backprojection reconstruction, a cone beam algorithm, an iterative algorithm and/or other algorithm.

A patient support 118, such as a couch, supports an object or subject such as a human patient in the examination region 106.

A general-purpose computing system or computer serves as an operator console 120. A processor of the console 120 executes computer readable instructions on the console 126, which allows an operator to control operation of the system 100 such as selecting a full dose or low dose scan protocol, activating projection data de-noising, initiating scanning, etc.

In the illustrated embodiment, the projection data de-noiser 114 is shown as a separate component. In another embodiment, the projection data de-noiser 114 is part of the console 120 and/or other computing device.

Figure 2:
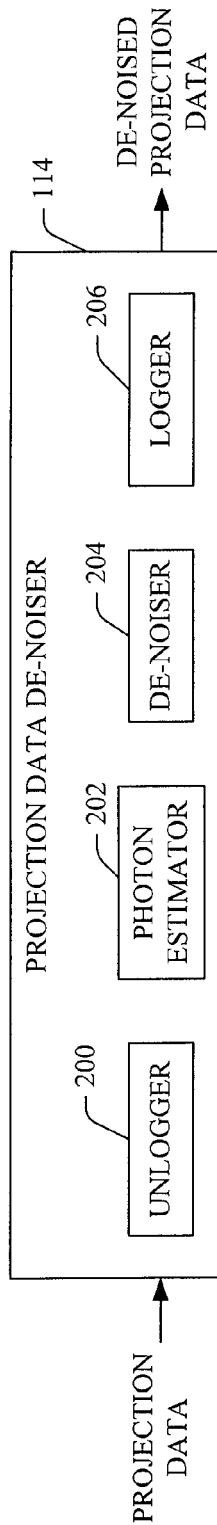
FIG. 2 illustrates an example projection data de-noiser.

FIG. 2 illustrates an example of the projection data de-noiser 114. The illustrated projection data de-noiser 114 includes a data unlogger 200 that unlogs the projection data, which converts the attenuation line integrals into detected photons.

A photon estimator 202 estimates a number of detected photons for each projection and generates a signal indicative thereof. The photon estimator 202 can employ various approaches to estimate the number of photons. By way of example, the detected number of photons can be estimated as the mean number of detected photons for each projection. Additionally, this mean may be smoothed, for example, using a moving average, which may facilitate mitigating large deviations in the Poisson random variable for a very small number of detected photons. Other techniques including but not limited generally known techniques for estimating the number of detected photons are also contemplated herein.

A de-noiser 204 de-noises the detected photon signal based on the estimated noise. The de-noiser 204 can de-noise the detected photons for a two dimensional projection based solely on the two dimensional projection or on the two dimensional projection and one or more neighboring two dimensional projections. As noted above, the de-noiser 204 may employ an algorithm which de-noises projections corresponding to a lower number of photons more aggressively than projections corresponding to a higher number of photons, which facilitates mitigating streaks while preserving edges.

A data logger 206 logs the de-noised detected photons, which converts the de-noised detected photons back into attenuation line integrals, which can be reconstructed by the reconstructor 116.

An evaluator 208 can be utilized to determine whether a given projection should be de-noised based on a predetermined photon number threshold. In this case, where the estimated number of photons for a projection indicates that there is a sufficient number of photons for the projection, the projection is not de-noised. Otherwise, the projection is de-noised. De-noising only those projections that are deemed to not have enough photons may increase processing speed relative to de-noising every projection. In another embodiment, the evaluator 208 can be omitted.

The following provides a non-limiting example of a suitable de-noising algorithm, which is based on a total variation-minimization algorithm, treating each 2D projection as an image. A similar 3D method with appropriate redesign can also be used.

Computed tomography (CT) projection data can be represented as shown in Equation 1:

$$I = I_0 e^{-\int \mu(x) dl} \qquad \text{Equation 1}$$

wherein I represents the measured photons, $I_0$ represents the input photons, $\mu_x$ represents the attenuation function, and l represents the acquisition line.

Given the noise characteristics of photon measurements, I represents the mean photon measurements, and a single actual measurement f is a realization of Poisson random variables with mean I and probability $$P(f \mid I) = \prod \frac{e^{-I} I^f}{f!}.$$

The mean photon measurement I can be estimated from f by minimizing a cost function expressed as a sum of a total variation term and a weighted least-squares term as shown in Equation 2:

$$\hat{I} = \min\left\{ \int |\nabla I| + \frac{\beta}{2} \int v \cdot (I - f)^2 \right\} \qquad \text{Equation 2}$$

wherein v represents a general statistical weighting that gives a preference to the original projection when the noise is small and a preference to projections with small total variation when the noise is large.

Generally, the total variation term dominates when the estimated number of detected photons is lower and the weighted least-squares term dominates when the estimated number of detected photons is higher.

In Equation 2, β is an optional variable that represents a tuning parameter which controls the aggressiveness of the algorithm smoothing in which smaller values of β lead to more aggressive smoothing overall.

Equation 2 can be solved by discretizing the Euler-Lagrange partial differential equation (PDE) for as shown in Equation 3:

$$0 = -div\left(\frac{\nabla I}{|\nabla I|}\right) + \beta \cdot v \cdot (I - f). \qquad \text{Equation 3}$$

Equation 3 can be expressed in terms of an estimated mean number of detected photons for each projection as shown in Equation 4:

$$0 = -div\left(\frac{\nabla I}{|\nabla I|}\right) + \beta \cdot \rho_{sm}(m, r) \cdot (I(m, r) - f(m, r)), \qquad \text{Equation 4}$$

wherein $\rho_{sm}(m,r)$ represents the estimated mean number of detected photons, m represents the number of detectors, and r represents the number of rows. As described in greater detail below, $\rho_{sm}(m,r)$ in Equation 4 is derived by taking a smoothed version of the original measurement f, however, the estimated mean number of photons need not be smoothed. It is reasonable to replace v in Equation 3 with $\rho_{sm}(m,r)$ as the noise variance of the logged measurements is proportional to $1/\rho_{sm}(m,r)$.

By scaling as shown in Equation 4, small total variation in regions of high noise (low photons) and closeness to the original image in regions of high photon counts are preferred. Note that other forms of scaling the detected photons by are also possible. For example, in another embodiment, can vary with view angle.

The mean number of detected photons can be estimated as follows.

Starting from an input 2-D projection of the form of ρ(m,r), where the data is in the logged attenuation domain, the detected number of photons associated with this measurement can be estimated as the mean number of detected photons $\rho_{sm}(m,r)$ for each projection.

This mean or a smoothed mean can alternately be employed. A smoothed mean may facilitate mitigating large deviations in the Poisson random variable for a very small number of detected photons. With the latter case, the estimated number of photons is smoothed, for example, using a moving average over the estimated number of detected photons, as shown in EQUATION 5:

$$\rho_{sm}(m, r) = \frac{1}{nKernel^2} \sum_j \sum_k \rho(m, r), \quad \text{Equation 5}$$

wherein $j \in \{m-n:m+n\}$, $k \in \{r-n:r+n\}$, nKernel represents a smoothing kernel, and $$n = \frac{nKernel - 1}{2}.$$

Other smoothing approaches are also contemplated herein. For detectors at the edges of the projection, values can be extrapolated or otherwise determined to fill the necessary buffer.

Equation 4 can be solved by using Equation 5 based on an iterative fixed point approach in which each update i+1 is determined from a previous update image i according to EQUATION 6:

$$\rho^{i+1}(j, k) = \frac{\sum_{\rho \in \{w,e,n,s\}} W_p \rho^i(j, k) + \rho_{\mathit{eff}}(j, k) \cdot \rho^i(j, k)}{\sum_{\rho \in \{w,e,n,s\}} W_p + \rho_{\mathit{eff}}(j, k)}. \quad \text{Equation 6}$$

wherein $\rho_{\mathit{eff}}(m, r) = \beta \cdot \rho_{sm}(m, r)$ and $W_p$ represents weights, which can be variously computed, for example, as known in the art.

The de-noised detected photons are logged as shown in EQUATION 7:

$$\rho_{out}(m, r) = -\log\left(\frac{\rho_{dn}(m, r)}{N_r(m, r)}\right) s. \quad \text{Equation 7}$$

wherein $\rho_{out}(m,r)$ represents the output logged de-noised detected photons, $\rho_{dn}(m,r)$ represents the de-noised detected photons, $N_r(m,r)$ represents the number of photons, and s represents a scaling factor. EQUATION 7 converts the de-noised detected photons back into attenuation line integrals for reconstruction.

The foregoing de-noising algorithm is computationally efficient, for example, because the de-noising operation is applied once to the projection data at acquisition, followed by a single filtered-backprojection reconstruction, and does not required the heavy computational burden of multiple forward- and backprojections in a Maximum Likelihood iterative approach.

Furthermore, the foregoing de-noising algorithm provides significant streak reduction to the reconstructed images, while not affecting the projections with good statistics, relative to a configuration in which the de-noising algorithm is not applied the projections. By applying the de-noising algorithm in the unlogged projection domain, bias from a low photon count can also be mitigated.

Figure 3:
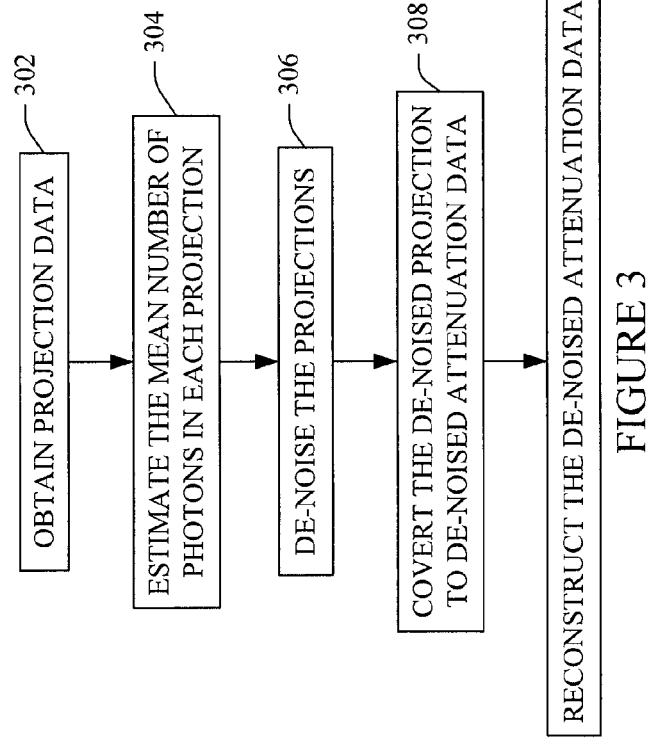
FIG. 3 illustrates an example method for de-noising projection data with the projection data de-noiser.

FIG. 3 illustrates an example method for de-noising projection data.

At 302, a plurality of two-dimensional projection signals (projection data) is acquired. The projection can be generated by the system 100 and/or other imaging system.

At 304, a mean number of detected photons is estimated for each of the projections;

At 306, at least a sub-set of the projections are de-noised using an algorithm which gives preference to the original projections when the noise is small and preference to projections with small total variation when the noise is large as described herein. As noted above, projection having a sufficient number of photons need not be de-noised.

At 308, the de-noised projections are converted into de-noised attenuation data.

At 310, the de-noised attenuation data are reconstructed to generate one or more images.

The above may be implemented by way of computer readable instructions, which when executed by a computer processor(s), cause the processor(s) to carry out the described acts. In such a case, the instructions are stored in a computer readable storage medium associated with or otherwise accessible to the relevant computer.

It is to be appreciated that the projection data de-noiser 114 can be implemented through one or more processors that execute one or more computer readable and/or executable instructions stored or encoded on computer readable storage medium such as physical memory. Additionally or alternatively, the instructions can be stored on transitory medium such as signal medium or the like.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A system, comprising:
   a source that rotates about an examination region and emits radiation that traverses the examination region;
   a radiation sensitive detector array that detects radiation traversing the examination region and generates projection data indicative of the detected radiation;
   evaluator that determines whether a projection is de-noised based on the number of detected photons for the projection; and
   a projection data de-noiser that de-noises the projection data based on the number of detected photons for the projection,
   wherein at least one projection includes a number of detected photons that satisfies a predetermined number of photons threshold and is not de-noised, and at least one projection includes a number of detected photons that does not satisfy the predetermined number of photons threshold and is de-noised.

2. The system of claim 1, the de-noiser, comprising:
   a photon estimator that estimates a number of detected photons for each projection, wherein the projection data de-noiser de-noises the projection data based on the estimated number of detected photons.

3. The system of claim 2, wherein the estimated number of detected photons represents a smoothed moving average over the estimated number of detected photons.

4. The system of claim 2, the projection data de-noiser, further comprising:

a de-noiser that de-noises projections based on minimizing a cost function, including at least two terms, a first total variation term and a second weighted least-squares term, and the estimated number of detected photons.

5. The system of claim 2, the projection data de-noiser, further comprising:
a de-noiser that de-noises a projection by giving preference to the projection when the estimated detected number of photons is large and preference to projections with small total variation when the estimated detected number of photons is small.

6. The system of claim 4, wherein de-noiser employs an iterative algorithm to minimize the cost function.

7. The system of claim 1, further comprising:
a reconstructor that reconstructs the de-noised projection data to generate volumetric image data.

8. The system of claim 1, wherein the projection data de-noiser de-noises projections having a lower number of photons to a greater degree relative to projections having a higher number of photons.

9. The system of claim 1, wherein the projection data de-noiser reduces noise while maintaining a given image resolution.

10. A system, comprising:
a source that rotates about an examination region and emits radiation that traverses the examination region;
a radiation sensitive detector array that detects radiation traversing the examination region and generates projection data indicative of the detected radiation; and
a projection data de-noiser that de-noises the projection data, wherein the de-noiser de-noises a projection based on a number of detected photons for the projection, wherein the projection data de-noiser de-noises a projection by giving preference to the projection when the estimated detected number of photons is large and preference to projections with small total variation when the estimated detected number of photons is small.

11. A method, comprising:
emitting, with a source rotating about an examination region, radiation that traverses the examination region;
detecting, with a radiation sensitive detector array, radiation traversing the examination region and generating projection data indicative of the detected radiation;
determining whether a projection is de-noised based on the number of detected photons for the projection; and
de-noising the projection data based on the number of detected photons for the projection,
wherein at least one projection includes a number of detected photons that satisfies a predetermined number of photons threshold and is not de-noised, and at least one projection includes a number of detected photons that does not satisfy the predetermined number of photons threshold and is de-noised.

12. The method of claim 11, further comprising:
estimating a number of detected photons for each projection; and
de-noising the projection data based on the estimated number of detected photons.

13. The method of claim 12, wherein the estimated number of detected photons represents a smoothed moving average over the estimated number of detected photons.

14. The method of claim 12, further comprising:
de-noising the projections based on minimizing a cost function, which includes at least two terms, a first total variation term and a second weighted least-squares term, and the estimated number of detected photons.

15. The method of claim 14, further comprising:
de-noising a projection by giving preference to the projection when the estimated detected number of photons is large and preference to projections with small total variation when the estimated detected number of photons is small.

16. The method of claim 14, further comprising:
employing an iterative algorithm to minimize the cost function.

17. The method of claim 11, further comprising:
a reconstructor that reconstructs the de-noised projection data to generate volumetric image data.

18. The method of claim 11, further comprising:
de-noising projections having a lower number of photons to a greater degree relative to projections having a higher number of photons.

19. The method of claim 11, further comprising:
reducing noise while maintaining a given image resolution.

* * * * *